US011438472B2

(12) United States Patent
Okauchi

(10) Patent No.: US 11,438,472 B2
(45) Date of Patent: Sep. 6, 2022

(54) DISPLAY DEVICE AND IMAGE FORMING APPARATUS

(71) Applicant: KYOCERA Document Solutions Inc., Osaka (JP)

(72) Inventor: Yoshifumi Okauchi, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 17/487,829

(22) Filed: Sep. 28, 2021

(65) Prior Publication Data
US 2022/0103707 A1   Mar. 31, 2022

(30) Foreign Application Priority Data
Sep. 29, 2020   (JP) .............................. JP2020-163994

(51) Int. Cl.
*H04N 1/00* (2006.01)
*G03G 15/00* (2006.01)

(52) U.S. Cl.
CPC ..... *H04N 1/00477* (2013.01); *G03G 15/5016* (2013.01); *H04N 1/00037* (2013.01); *H04N 1/0049* (2013.01); *H04N 1/00408* (2013.01)

(58) Field of Classification Search
CPC ........... H04N 1/00477; H04N 1/00037; H04N 1/00408; H04N 1/0049; G03G 15/5016
See application file for complete search history.

(56) References Cited

U.S. PATENT DOCUMENTS

| 4,682,014 A * | 7/1987 | Iwama | G06F 3/002 235/487 |
|---|---|---|---|
| 8,777,472 B2 | 7/2014 | Okada | |
| 2015/0261168 A1* | 9/2015 | Yokoyama | G06F 1/3231 399/81 |
| 2019/0291445 A1* | 9/2019 | Yamada | B41J 2/17523 |
| 2020/0110308 A1* | 4/2020 | Hattori | G06F 1/1609 |

FOREIGN PATENT DOCUMENTS

JP   2012-168463 A   9/2012

* cited by examiner

*Primary Examiner* — Iriana Cruz
(74) *Attorney, Agent, or Firm* — Studebaker & Brackett PC

(57) ABSTRACT

A display device includes a display window, a light guide member, a first light emitting element and a second light emitting element. The display window is provided in a housing and is formed in a slit shape extending in a predetermined direction from one end side to the other end side. Thea light guide member is disposed in the display window. The first light emitting element faces one end portion of the light guide member on the one end side. The second light emitting element faces the other end portion of the light guide member on the other end side. A display area of the light guide member is exposed through the display window.

6 Claims, 7 Drawing Sheets

DISPLAY DEVICE AND IMAGE FORMING APPARATUS

INCORPORATION BY REFERENCE

This application is based on and claims the benefit of priority from Japanese patent application No. 2020-163994, filed on Sep. 29, 2020, which is incorporated by reference in its entirety.

BACKGROUND

The present disclosure relates to a display device and an image forming apparatus.

An image forming apparatus is provided with a display device which is provided in a housing and displays an apparatus state. As such a display device, a display device in which a transparent resin exposed from the housing is illuminated by a light emitting element from the inside is known. In the display device, a light condensing member is disposed on the back side of the transparent resin, and the light emitting element is disposed on the back side of the light condensing member. When a predetermined apparatus state is detected, light emitted from the light emitting element is incident on the back side surface of the transparent resin through the condensing member. The incident light is scattered over the entire area of the transparent resin to make the surface of the transparent resin bright, thereby informing the user of the apparatus state.

In order to allow the user who is away from the image forming apparatus to confirm the apparatus state, there is a need to secure a wide display area at a specific location, such as near a sheet discharge port. However, even if the display area is secured at such a specific location, depending on the layout of the member inside the apparatus, the light emitting element may not be disposed on the back side of the display area, and the entire area of the display area may not be illuminated by the light emitting element.

SUMMARY

In accordance with an aspect of the present disclosure, a display device includes a display window, a light guide member, a first light emitting element and a second light emitting element. The display window is provided in a housing and is formed in a slit shape extending in a predetermined direction from one end side to the other end side. Thea light guide member is disposed in the display window. The first light emitting element faces one end portion of the light guide member on the one end side. The second light emitting element faces the other end portion of the light guide member on the other end side. A display area of the light guide member is exposed through the display window.

In accordance with an aspect of the present disclosure, an image forming apparatus includes the display device, an image forming part which forms an image on a sheet, and a sheet discharge port through which the sheet on which the image is formed in the image forming part is discharged.

The other features and advantages of the present disclosure will become more apparent from the following description. In the detailed description, reference is made to the accompanying drawings, and preferred embodiments of the present disclosure are shown by way of example in the accompanying drawings.

DETAILED DESCRIPTION

Hereinafter, with reference to the attached drawings, an image forming apparatus including a display device in the present embodiment will be described. In the following description, a printer will be described as an example of the image forming apparatus. Fr, Re, U, Lo R and L marked in each figure indicate a front side, a rear side, an upper side, a lower side, a right side and a left side of the printer.

Figure 1:
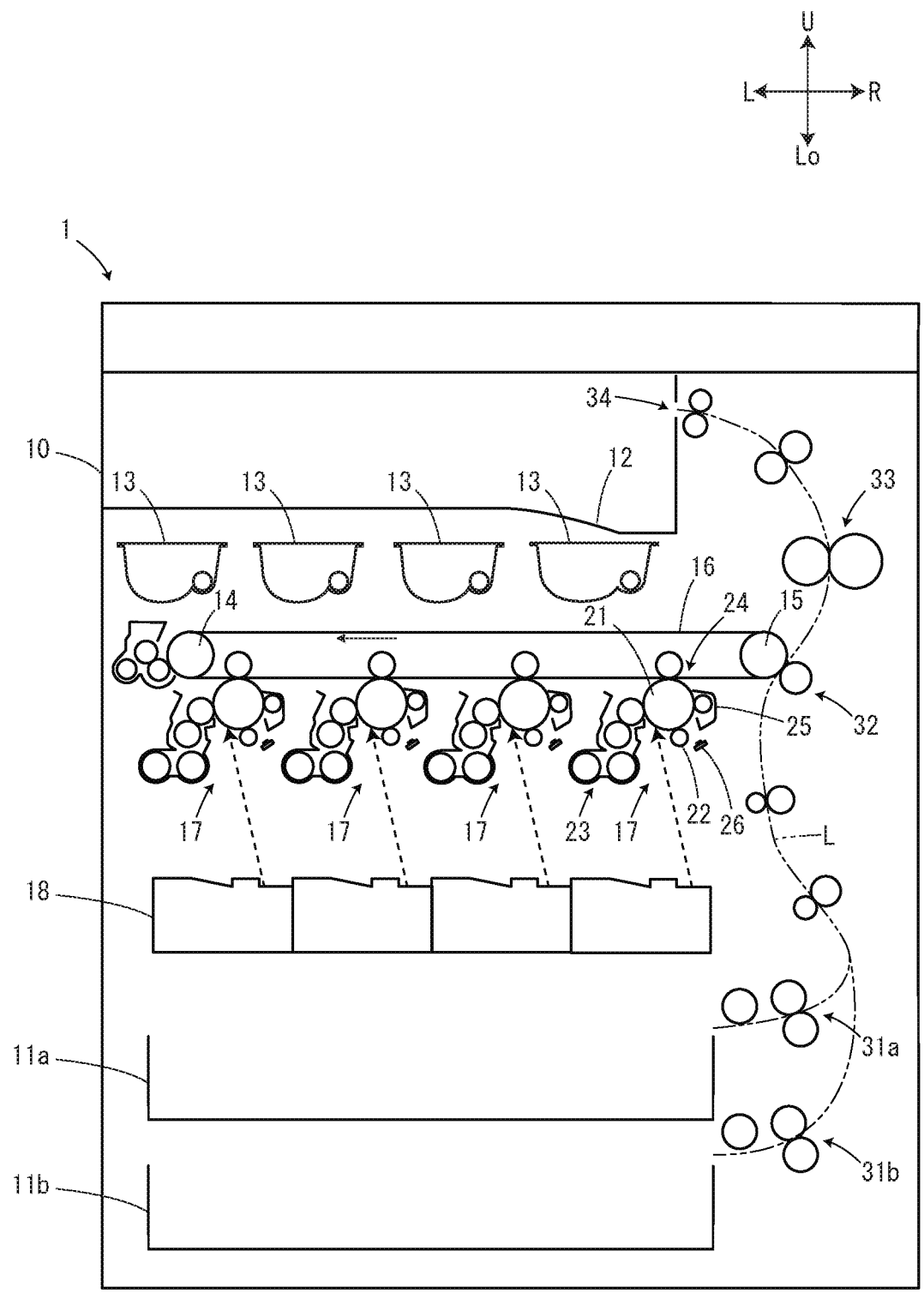
FIG. 1 is a view schematically showing a printer in the present embodiment.

As shown in FIG. 1, the printer 1 includes a box-shaped housing 10 in which various devices are stored. In the lower portion of the housing 10, sheet feeding cassettes 11a and 11b in which a bundle of sheets is set are stored, and in the upper portion of the housing 10, a sheet discharge tray 12 on which the image-formed sheet is stacked is provided. Below the sheet discharge tray 12, toner containers 13 containing toners of four colors (for example, magenta, cyan, yellow, and black) are detachably set. Below the toner containers 13, an intermediate transfer belt 16 stretched between right and left rollers 14 and 15 is provided.

Along the lower side of the intermediate transfer belt 16, image forming parts 17 for the colors of the toner are provided in a row along the left-and-right direction. In each image forming part 17, a photosensitive drum 21 is provided so as to be rotated in contact with the intermediate transfer belt 16. Around the photosensitive drum 21, a charger 22, a development device 23, a primary transferring part 24, a cleaning device 25, and an eraser 26 are disposed in the order of primary transferring process. A waste toner box (not shown) is connected to the cleaning devices 25. The toner is supplied to each development device 23 from the corresponding toner container 13 through a supply path (not shown), and the waste toner is discharged to the waste toner box from each cleaning device 25 through a discharge path (not shown).

Below the image forming parts 17, an exposure device 18 constituted by a laser scanning unit (LSU) is provided. In the right side portion of the housing 10, a conveyance path L for the sheet from the sheet feeding cassettes 11a and 11b to the sheet discharge tray 12 is formed by a plurality of rollers. At the upstream end (the lower side) of the conveyance path L, sheet feeding parts 31a and 31b are provided, and a secondary transfer area 32 is provided on the right end side of the intermediate transfer belt 16 on the downstream side of the sheet feeding parts 31a and 31b on the conveyance path L. A fixing device 33 is provided on the downstream side of the secondary transfer area 32 on the conveyance path L, and a sheet discharge port 34 is provided on the downstream side (the upper side) of the fixing device 33 on the conveyance path L.

When an image forming operation is performed by the printer 1, after the surface of the photosensitive drum 21 is charged by the charger 22, an electrostatic latent image is formed on the surface of the photosensitive drum 21 by laser beam emitted from the exposure device 18. Next, the toner is supplied to the electrostatic latent image on the surface of the photosensitive drum 21 from the development device 23 to form a toner image, and the toner image is primarily transferred from the surface of the photosensitive drum 21 to the surface of the intermediate transfer belt 16. In each image forming part 17, the toner image of each color is primarily transferred to the intermediate transferring belt 16 to form a full-color toner image on the surface of the intermediate transfer belt 16. The waste toner and the electric charge remaining on the photosensitive drum 21 are removed by the cleaning device 25 and the eraser 26.

On the other hand, the sheet is fed from the sheet feeding cassettes 11a and 11b or a manual sheet feeding tray (not shown) by the sheet feeding parts 31a and 31b, and the fed sheet is conveyed toward the secondary transfer area 32 in synchronization with the image forming operation described above. In the secondary transfer area 32, the full-color toner image is secondarily transferred from the surface of the intermediate transfer belt 16 to the surface of the sheet, and the sheet on which the toner image is transferred is conveyed toward the fixing device 33 downstream of the secondary transfer area 32. In the fixing device 33, the toner image is fixed to the sheet, and the sheet on which the toner image is fixed is discharged through the sheet discharge port 34 on the sheet discharge tray 12. In this manner, the toner image transferred on the sheet passes through the fixing device 33 to form the image on the surface of the sheet.

Figure 2:
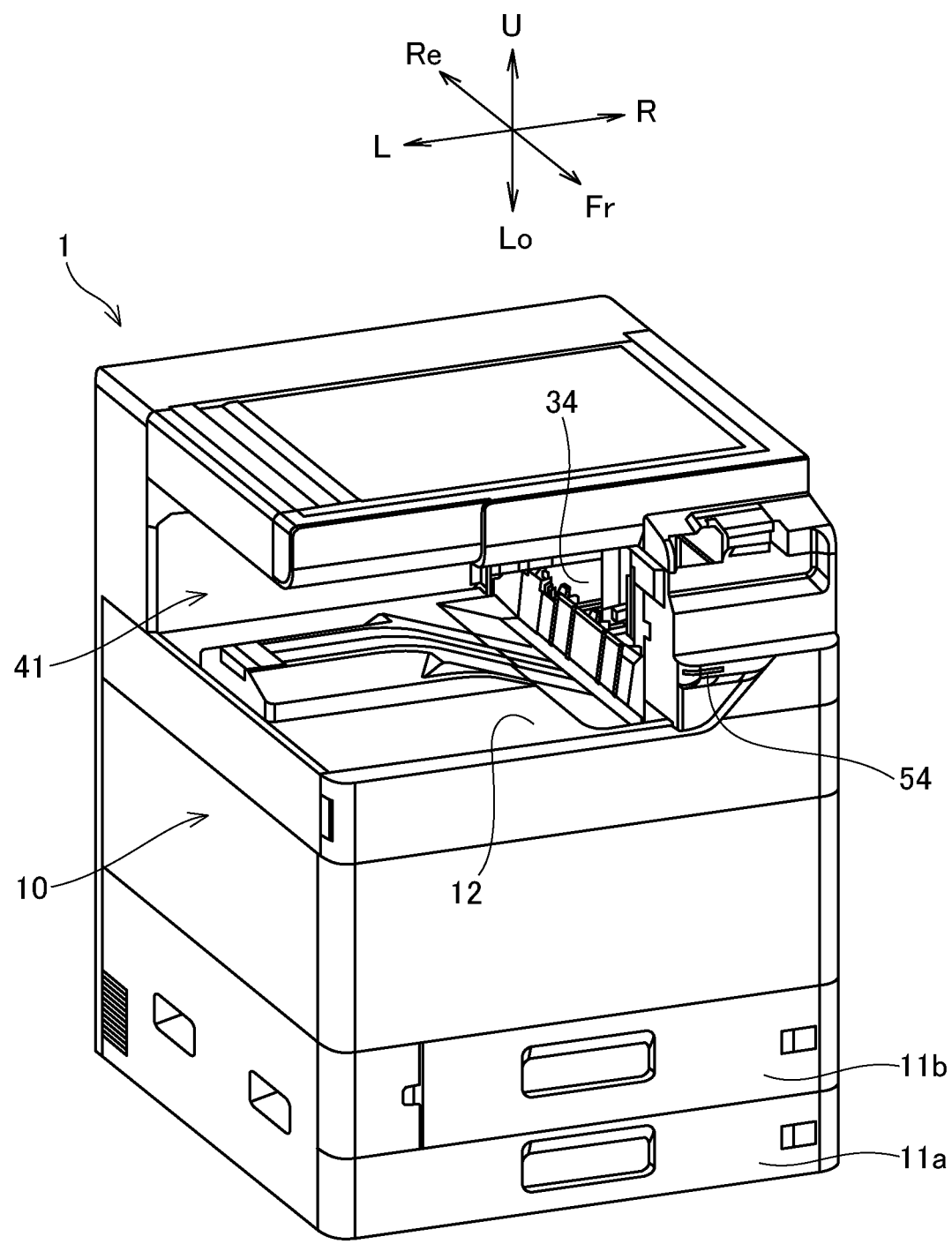
FIG. 2 is a perspective view showing an external appearance of the printer in the present embodiment.

As shown in FIG. 2, the housing 10 of the printer 1 is formed with an in-body space 41, and the housing 10 has the sheet discharge port 34 opened to the in-body space 41. A bottom surface of the in-body space 41 serves as the sheet discharge tray 12, and the sheet discharged through the sheet discharge port 34 to the in-body space 41 is stacked on the sheet discharge tray 12. It is needed to provide a display area 54 near the sheet discharge port 34 in order to display a sheet discharge state, but a human detection sensor 42 (see FIG. 5) is installed near the sheet discharge port 34 of the housing 10 so as to detect a user who approaches the front surface of the printer 1. Therefore, it is difficult to provide the display area 54 near the sheet discharge port 34 of the housing 10.

It is also desirable to make the display area 54 wide such that the user who is away from the printer 1 can recognize the display area 54, especially, such that the user can recognize the sheet discharging by communication with an external device, such as a facsimile. Then, in the present embodiment, the human detection sensor 42 is disposed on the rear side of the display area 54, and a first and second light emitting elements 63 and 64 (see FIG. 5) are disposed on the lateral side of the human detection sensor 42 so as not to interfere with the human detection sensor 42. Light emitted from the first and second light emitting elements 63 and 64 is guided to the display area 54 through a light guide member 51 (see FIG. 5), so that the display area 54 provided widely near the sheet discharge port 34 of the housing 10 is brightly illuminated.

Figure 3:
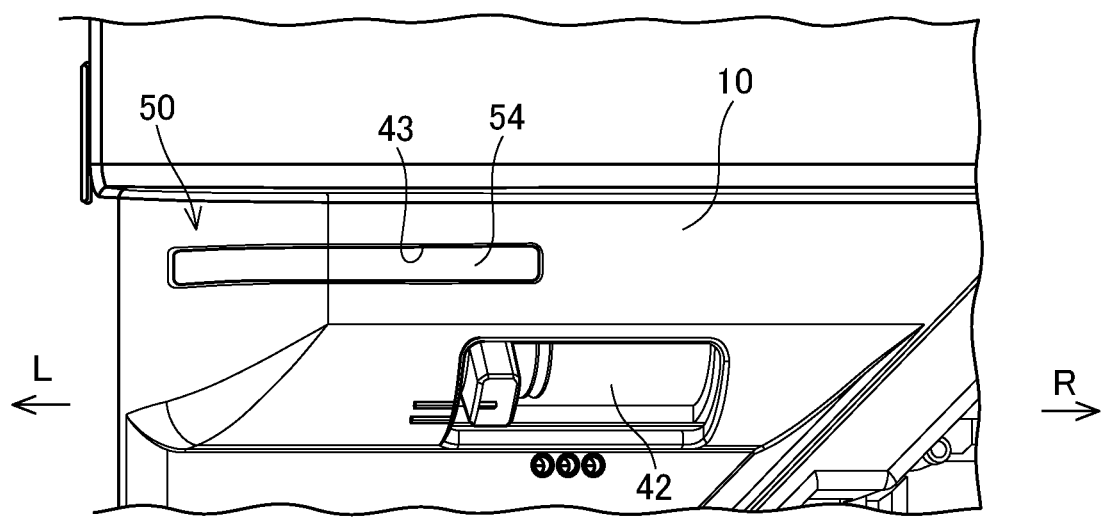
FIG. 3 is a perspective view showing a display device in the present embodiment, when viewed from an outside of a housing.
Figure 4:
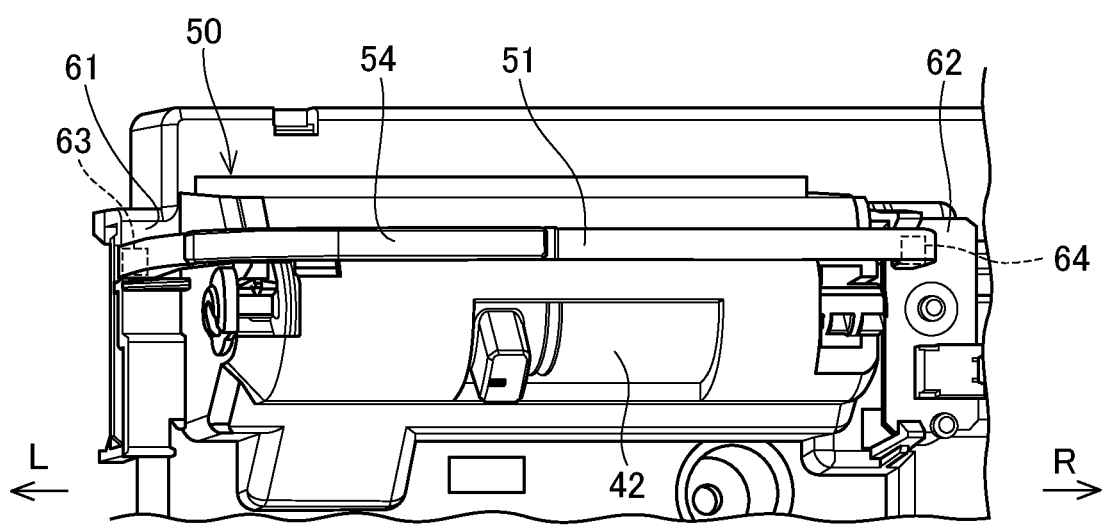
FIG. 4 is a perspective view showing the display device in the present embodiment, when viewed from an inside of the housing.
Figure 5:
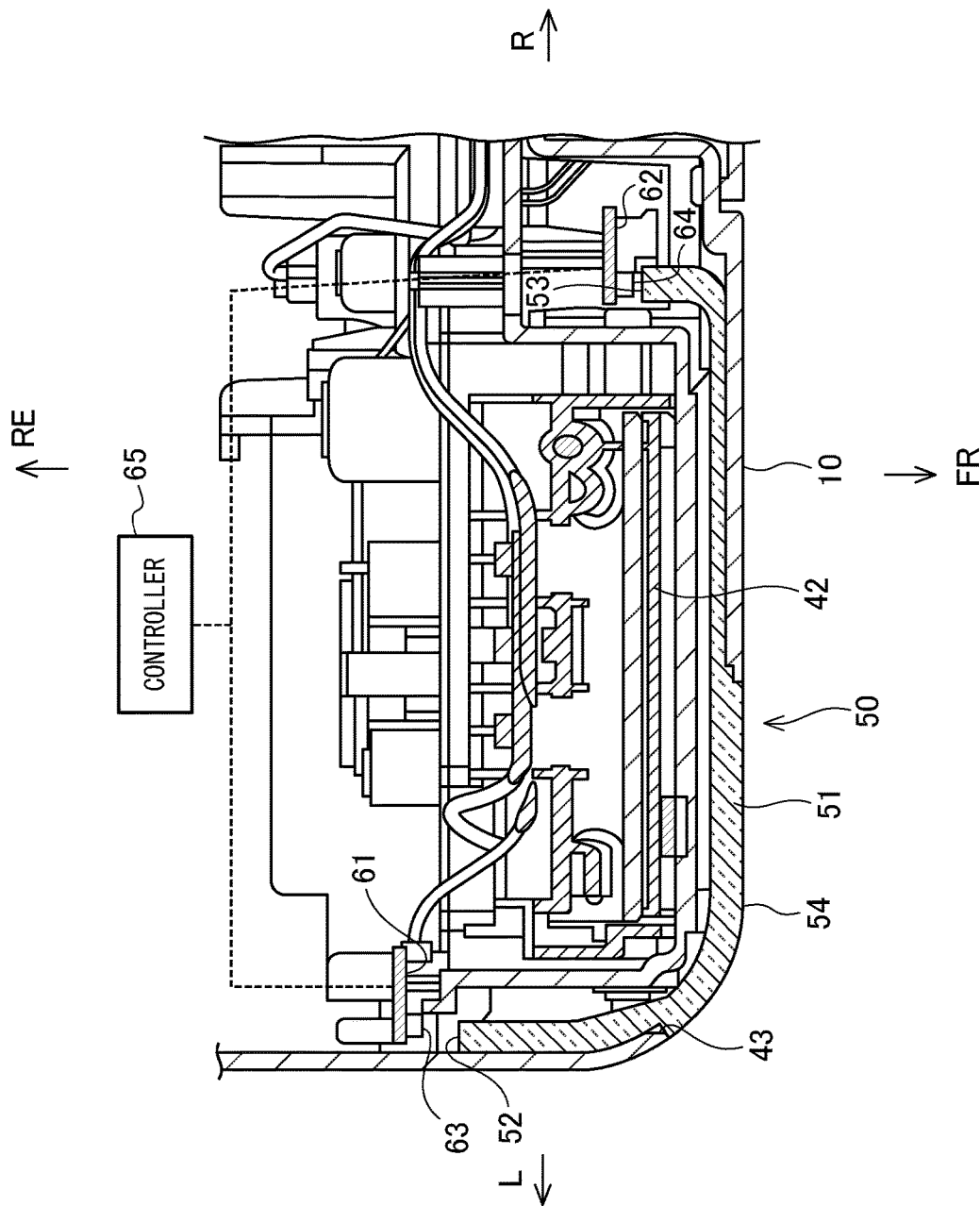
FIG. 5 is a sectional view showing the display device in the present embodiment.
Figure 6:
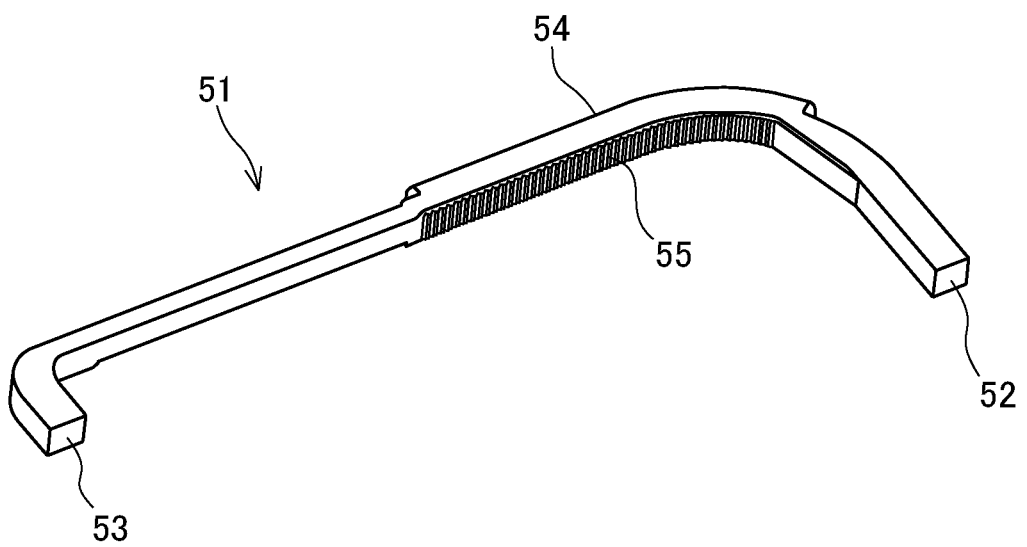
FIG. 6 is a perspective view showing a light guide member in the present embodiment.

With reference to FIG. 3 to FIG. 6, the display device will be described. FIG. 3 is a perspective view showing the display device of the present embodiment, when viewed from the outside of the housing. FIG. 4 is a perspective view showing the display device of the present embodiment, when viewed from the inside of the housing. FIG. 6 is a perspective view showing the light guide member of the present embodiment.

As shown in FIG. 3, a display device 50 is stored inside the housing 10, and the apparatus state is displayed through a display window 43 formed near the sheet discharge port 34 (see FIG. 2) of the housing 10. The display window 43 is opened into a slit shape long in the left-and-right direction (a predetermined direction) at a corner of the housing 10. The display area 54 of the light guide member 51 is exposed through the display window 43, and when the display area 54 is illuminated, the apparatus state such as the sheet discharging state is recognized by the user. Because the display window 43 is opened from the corner to the front surface of the housing 10, the display area 54 is visible from the lateral side (the left side) and the front side of the housing 10.

As shown in FIG. 4 and FIG. 5, the human detection sensor 42 is installed inside the housing 10, and the display device 50 is disposed so as not to interfere with the human detection sensor 42. The display device 50 guides the light emitted from the first and second light emitting elements 63 and 64 disposed on both the lateral sides of the human detection sensor 42 to the display area 54 through the linear light guide member 51 disposed in a gap between the human detection sensor 42 and the housing 10. The light guide member 51 extends from one side to the other side of the display window 43 so as to go around the front surface of the human detection sensor 42. One end portion 52 of the light guide member 51 is disposed on the left rear side of the human detection sensor 42 and the other end portion 53 of the light guide member 51 is disposed on the light side of the human detection sensor 42.

On the left rear side of the human detection sensor 42, a first board 61 is installed, and the first light emitting element 63 is mounted on the front surface of the first board 61. On the right side of the human detection sensor 42, a second board 62 is installed, and the second emitting element 64 is mounted on the front surface of the second board 62. The first and second light emitting elements 63 and 64 are each a LED (a light emitting diode). The first light emitting element 63 faces the one end portion 52 of the light guide member 51, and the second light emitting element 64 faces the other end portion 53 of the light guide member 51. The light emitted from the first light emitting element 63 is incident on the one end portion 52 of the light guide member 51, and the light emitted from the second light emitting element 64 is incident on the other end portion 53 of the light guide member 51.

The light emitted from the first and second light emitting elements 63 and 64 is guided to the display area 54 through the light guide member 51. The first light emitting element 63 illuminates the one end side half of the display area 54, and the second light emitting element 64 illuminates the other end side half of the display area 54. Then, the first and second light emitting elements 63 and 64 illuminate the entire area of the display area 54. In the above manner, the first and second light emitting elements 63 and 64 disposed on the side of the one end portion 52 and on the side of the other end portion 53 illuminate the display area 54, so that the first and second light emitting elements 63 and 64 do not interfere with the human detection sensor 42. In addition, it becomes possible to make the display area 54 of the light guide member 51 wide and to improve visibility.

As shown in FIG. 6, the light guide member 51 is made of transparent resin, and is formed into a linear shape. One end side portion of the light guide member 51 is curved around the inner surface of the corner of the housing 10, and the other end side portion of the light guide member 51 is bent into a L-shape. A portion of the surface of the light guide member 51 is protruded forward so as to correspond to the display window 43 (see FIG. 3) and forms the display area 54. On the rear side of the display area 54, a scattering area 55 which scatters the light guided to the light guide member 51 and emits it through the display area 54 is formed. The scattering area 55 is formed by a convex and concave surface in which concave portions and convex portions extending in the upper-and-lower direction perpendicular to the extending direction of the light guide member 51 are disposed.

With reference to FIG. 5 again, the display device 50 includes a controller 65 which controls the first and second light emitting elements 63 and 64. The controller 65 controls the first and second light emitting elements 63 and 64 to be applied with voltage such that the first and second light emitting elements 63 and 64 are intermittently turned on, or turned on. Since the first and second light emitting elements 63 and 64 are individually controlled by the controller 65, the one end side half and the other end side half of the display area 54 can be displayed in different display modes. By switching the light emitting pattern of the first and second light emitting elements 63 and 64, various apparatus states can be notified to the user according to a change of the display mode of the display area 54.

Because each of the first and second light emitting elements 63 and 64 is turned off, intermittently turned on, and turned on, the light emitting pattern of the first and second light emitting elements 63 and 64 is switched to nine light emitting patterns by a combination of turning off, intermittent turning on, and turning on. Therefore, nine types of the apparatus states can be represented according to the light emitting patterns. In the printer 1 of the present embodiment, the light emitting pattern of the first and second light emitting elements 63 and 64 represents the four apparatus states: a state where data is not received, a state where data is being received, a state where the sheet is being discharged, and a state where the sheet has been discharged. According to the display mode of the display area 54, the user can recognize the discharge state of the sheet through the sheet discharge port 34.

The controller 65 may be implemented by software using a processor or by a logic circuit (hardware) formed in an integrated circuit or the like. When the processor is used, various processes are executed by reading and executing a program stored in a memory by the processor. For example, a CPU (a Central Processing Unit) is used as the processor. The memory includes one or a plurality of storage media such as ROM (Read Only Memory) and RAM (Random Access Memory) depending on the application.

Figure 7:
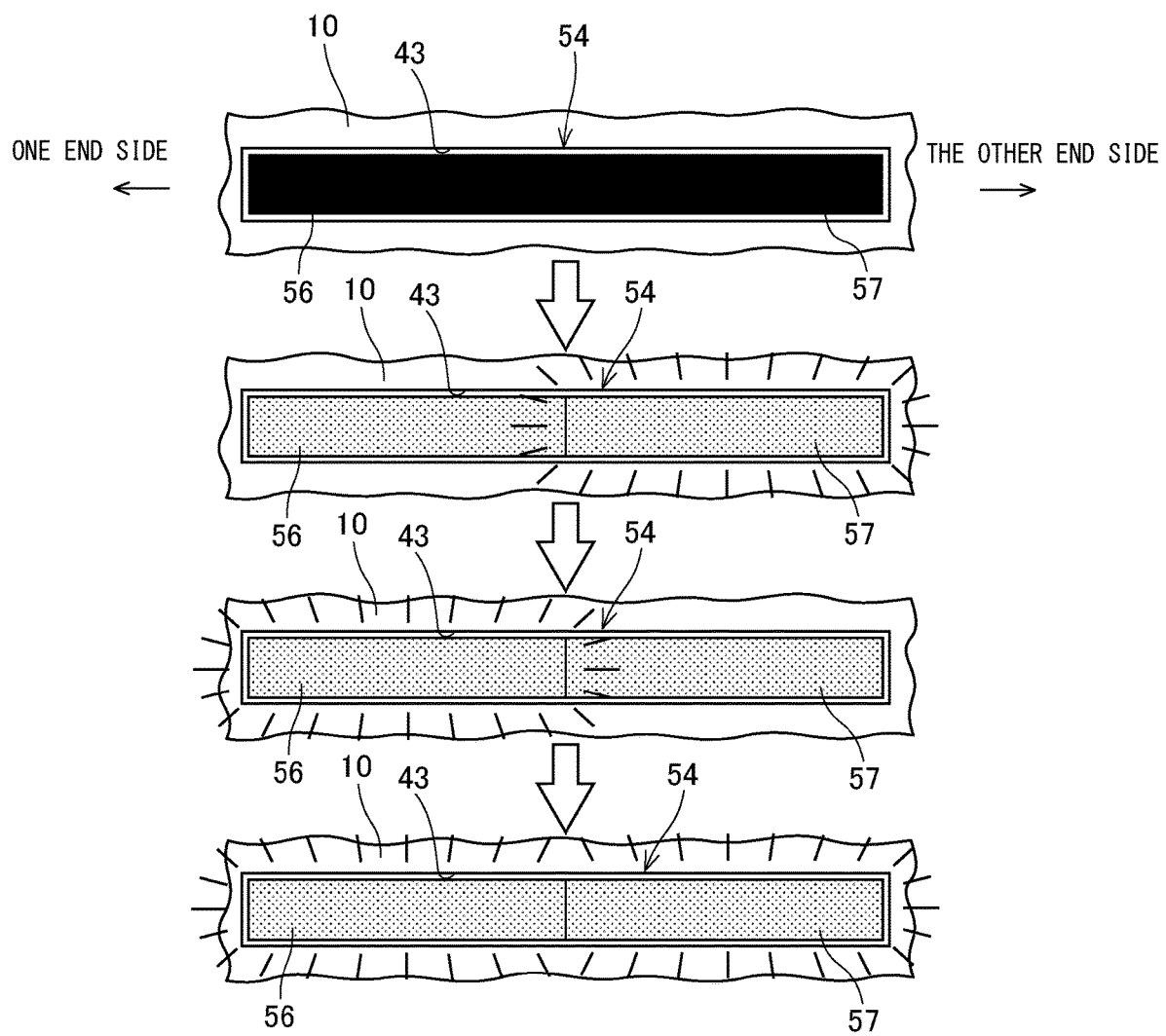
FIG. 7 is a view showing an example of a change of a display area during a sheet discharging, in the present embodiment.

With reference to FIG. 7, a change of the display area during the sheet discharge will be described. FIG. 7 is a view showing an example of the change of the display area during the sheet discharge in the present embodiment. Here, a change of the display area when the sheet is discharged by communication with an external device such as a facsimile will be described. Reference numbers shown in FIG. 5 are suitably used.

As shown in FIG. 7, the wide slit-shaped display window 43 is formed in the housing 10. One end side portion of the display window 43 is closer to the sheet discharge port 34 and the other end side portion of the display window 43 is far from the sheet discharge port 34. The entire area of the display area 54 is exposed through the display window 43, and the one end side half 56 of the display area 54 is closer to the sheet discharge port 34 than the other end side half 57 of the display area 54. Before the data is received by the printer 1 (during waiting), the controller 65 controls the first and second light emitting elements 63 and 64 to be tuned off. Because both the end portions 52 and 53 of the light guide member 51 are not illuminated by the first and second light emitting elements 63 and 64, the entire area of the display area 54 is dark and is not noticeable.

When the date is received by the printer 1, the controller 65 controls the first light emitting element 63 to be turned on while controlling the second light emitting element 64 to be intermittently turned on. The light emitted from the first light emitting element 63 is incident on the one end portion 52 of the light guide member 51, and the one end side half 56 of the display area 54 is continuously illuminated with the light. The light emitted from the second light emitting element 64 is incident on the other end portion 53 of the light guide member 51, and the other end side half 57 of the display area 54 is intermittently illuminated with the light. As described above, the one end side half 56 closer to the sheet discharge port 34 is lighted and the other end side half 57 far from the sheet discharge port 34 is blinked, so that the user can recognize that the data is being received.

When the sheet discharge process is started in the printer 1, the controller 65 controls the first light emitting element 63 to be intermittently turned on while controlling the second light emitting element 64 to be turned on. The light emitted from the first light emitting element 63 is incident on the one end portion 52 of the light guide member 51, and the one end side half 56 of the display area 54 is intermittently illuminated with the light. The light emitted from the second light emitting element 64 is incident on the other end portion 53 of the light guide member 51, and the other end side half 57 of the display area 54 is continuously illuminated with the light. As described above, the one end side half 56 closer to the sheet discharge port 34 is blinked and the other end side half 57 far from the sheet discharge port 34 is lighted, so that the user can recognize that the data is being received.

When the sheet discharge process is completed in the printer 1, the controller 65 controls the first and second light emitting elements 63 and 64 to be intermittently turned on. The light emitted from the first and second light emitting element 63 and 64 is incident on the one end portion 52 and the other end portion 53 of the light guide member 51, and the entire area of the display area 54 is intermittently illuminated with the light. The entire area of the display area 54 near the sheet discharge port 34 is blinked, so that the user can recognize that the sheet has been discharged. At this case, until a predetermined time elapses immediately after the sheet discharge process of the printer 1 is completed, the first and second light emitting elements 63 and 64 are intermittently turned on, and after the predetermined time elapses, the first and second light emitting elements 63 and 64 are turned off.

In the above manner, the first light emitting element 63 is turned on and the second light emitting element 64 is intermittently turned on during date reception (a period where the data is being received), the first light emitting element 63 is intermittently turned on and the second light emitting element 64 is turned on during sheet discharge (a period where the sheet is being discharged), and the first and second light emitting elements 63 and 64 are intermittently turned on after the sheet discharge. The other end side half 57 of the display area 54 far from the sheet discharge port 34 is blinked during the period where the data is being received, the one end side half 56 of the display area 54 closer to the sheet discharge port 34 is blinked during the period where the sheet is being discharged, and the entire area of the display area 54 is blinked after the sheet discharging. According to the blinking state of the display area 54 around the sheet discharge port 34, the user can recognize the state where the data is being received, the state where the sheet is being discharged, and the state where the sheet has been discharged.

As described above, according to the present embodiment, the light emitted from the first light emitting element 63 is incident on the one end portion 52 of the light guide member 51, and the light emitted from the second light emitting element 64 is incident on the other end portion 53 of the light guide member 51. Then, even if an installation space for the first and second light emitting elements 63 and 64 cannot be secured on the rear side of the display area 54, the first and second light emitting elements 63 and 64 can illuminate the entire area of the display area 54 of the light guide member 51. Further, since the light emitted from the first and second light emitting elements 63 and 64 is incident from both ends of the light guide member 51, it becomes possible to make the display area 54 wide and to improve visibility.

Further, since the display device 50 of the present embodiment is installed in the printer 1, the user can visually recognize the apparatus state of the printer 1 from a remote position.

In the present embodiment, although the first and second light emitting elements 63 and 64 are turned on or intermittently turned on by the controller 65, the first and second light emitting elements 63 and 64 may be modulated in color or light by the controller 65. The modulating in color refers to adjusting a color of the emitted light, and the modulating in light refers to adjusting an intensity of the emitted light.

In the present embodiment, although the light guide member 51 is formed in a linear shape, the light guide member 51 may be formed to extend from one end side to the other end side of the display window 43. For example, the light guide member 51 may be formed in a plate shape.

In the present embodiment, LEDs are shown as an example of the first and second light emitting elements 63 and 64, but an organic EL or an inorganic EL may be used as the first and second light emitting elements 63 and 64.

In the present embodiment, the display window 43 is opened in the housing 10, but the display window 43 may be covered with a transparent plate material. That is, the display window 43 is not limited to an opening, and the display window 43 may be formed to emit the light from the display device 50.

In the present embodiment, the display device 50 display the sheet discharge state, but the display device 50 may display other apparatus states of the printer 1. For example, the display device 50 may display an error or a sheet jamming. In addition, although the display device 50 is disposed near the sheet discharge port 34, the display device 50 may be disposed at any position of the printer 1.

The present embodiment shows the printer including the facsimile function as an example of the image forming apparatus, but the image forming apparatus may include another function such as a copying function.

Further, in the present embodiment, an example in which the display device 50 is applied to the image forming apparatus has been described, but the display device can be applied to other electronic equipment.

In the present embodiment, the sheet may have a sheet-like shape for forming an image, for example, may contain a plain paper, a coated paper, a tracing paper, or an OHP (Over Head Projector) sheet.

Although the present embodiment has been described, as another embodiment, the above-described embodiment and the modified example may be wholly or partially combined.

Further, the technique of the present disclosure is not limited to the above-described embodiment, and various changes, substitutions, and modifications may be made without departing from the spirit of the technical idea. Furthermore, if technological advances or other derived technologies can realize the technical ideas in other ways, they may be implemented using such methods. Accordingly, the claims cover all embodiments that may be contained within the scope of the technical concept.

The invention claimed is:

1. A display device comprising:
   a display window provided near a sheet discharge port of a housing and formed in a slit shape extending in a predetermined direction from one end side closer to the sheet discharge port to the other end side far from the sheet discharge port;
   a light guide member disposed in the display window;
   a first light emitting element facing one end portion of the light guide member on the one end side;
   a second light emitting element facing the other end portion of the light guide member on the other end side; and
   a controller controlling the first light emitting element and the second light emitting element, wherein
   a display area of the light guide member is exposed through the display window, and
   the first light emitting element illuminates one end side half of the display area, and the second light emitting element illuminates the other end side half of the display area, wherein
   the controller switches the display area to a plurality of different light emitting patterns by combining the first light emitting element and the second light emitting element to turn off, intermittently turn on, and turn on, and makes a user recognize a plurality of apparatus states corresponding to the light emitting patterns.

2. The display device according to claim 1, wherein
   when the first light emitting element is turned on, one end side half of the light guide member on the one end side is illuminated, and when the second light emitting element is turned on, the other end side half of the light guide member on the other end side is illuminated.

3. The display device according to claim 1, wherein
   the display window is formed at a corner of the housing along a horizontal direction.

4. The display device according to claim 1, wherein
   the controller controls the first light emitting element and the second light emitting element such that the first light emitting element and the second light emitting element are turned off during waiting,
   the first light emitting element is turned on and the second light emitting element is intermittently turned on during data reception,
   the first light emitting element is intermittently turned on and the second light emitting element is turned on during sheet discharge, and
   the first light emitting element is intermittently turned on and the second light emitting element is intermittently turned on after the sheet discharge.

5. The display device according to claim 1, wherein
   a human detection sensor is disposed inside the display window.

6. An image forming apparatus comprising:
   the display device according to claim 1;

an image forming part which forms an image on a sheet, and the sheet discharge port through which the sheet on which the image is formed in the image forming part is discharged.

\* \* \* \* \*